(12) United States Patent
Lee et al.

(10) Patent No.: US 11,639,832 B2
(45) Date of Patent: May 2, 2023

(54) RADIATIVE COOLING DEVICE HAVING MULTILAYER STRUCTURE

(71) Applicant: Korea University Research and Business Foundation, Seoul (KR)

(72) Inventors: Heon Lee, Seoul (KR); Soomin Son, Seoul (KR); Dongwoo Chae, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 224 days.

(21) Appl. No.: 17/110,479

(22) Filed: Dec. 3, 2020

(65) Prior Publication Data

US 2022/0049910 A1 Feb. 17, 2022

(30) Foreign Application Priority Data

Aug. 11, 2020 (KR) .................... 10-2020-0100751

(51) Int. Cl.
 *B32B 3/00* (2006.01)
 *F28F 21/06* (2006.01)
 (Continued)

(52) U.S. Cl.
 CPC ............ *F28F 21/067* (2013.01); *B32B 9/005* (2013.01); *B32B 9/045* (2013.01); *B32B 15/08* (2013.01);
 (Continued)

(58) Field of Classification Search
 CPC ... B32B 9/005; B32B 9/045; B32B 2307/412; B32B 2307/416
 See application file for complete search history.

(56) References Cited

U.S. PATENT DOCUMENTS

2018/0354848 A1 12/2018 Van Overmeere et al.
2020/0095429 A1 3/2020 Van Overmeere et al.

FOREIGN PATENT DOCUMENTS

CN 110103559 A * 8/2019 ............... B29D 7/01
CN 110567188 A 12/2019
(Continued)

OTHER PUBLICATIONS

Extended European Search Report dated May 12, 2021 in counterpart European Patent Application No. 20211867.5 (10 pages in English).

(Continued)

*Primary Examiner* — Elizabeth E Mulvaney
(74) *Attorney, Agent, or Firm* — NSIP Law

(57) ABSTRACT

The present disclosure relates to a technical idea of reducing the surface temperature of a material or temperature under a material by emitting heat under a device to the outside by absorbing and emitting long-wavelength infrared light corresponding to the wavelength range of the atmospheric window while minimizing absorption of light of the solar spectrum. More particularly, the present disclosure relates to a technology for providing a radiative cooling device having a multilayer structure that is capable of increasing sunlight reflection through differences in the refractive indexes of the device-forming materials while performing selective emission over the wavelength range of the atmospheric window using a radiative cooling device having a multilayer structure composed of polymers and inorganic materials.

17 Claims, 19 Drawing Sheets

(51) Int. Cl.
*B32B 9/00* (2006.01)
*B32B 9/04* (2006.01)
*B32B 15/08* (2006.01)
*B32B 27/06* (2006.01)

(52) U.S. Cl.
CPC .......... *B32B 27/06* (2013.01); *B32B 2307/30* (2013.01); *B32B 2307/416* (2013.01); *F28F 2255/06* (2013.01)

(56) References Cited

FOREIGN PATENT DOCUMENTS

| | | |
|---|---|---|
| CN | 111155332 A | 5/2020 |
| KR | 10-2036071 B1 | 10/2019 |
| KR | 10-2019-0130985 A | 11/2019 |
| KR | 10-2140669 B1 | 8/2020 |
| WO | WO 2020/195743 A1 | 10/2020 |

OTHER PUBLICATIONS

Korean Office Action dated Oct. 27, 2020 in counterpart Korean Patent Application No. 10-2020-0100751 (4 pages in Korean).

* cited by examiner

100

110

510

520

RADIATIVE COOLING DEVICE HAVING MULTILAYER STRUCTURE

CROSS-REFERENCE TO RELATED APPLICATION

This application claims priority to Korean Patent Application No. 10-2020-0100751, filed on Aug. 11, 2020 in the Korean Intellectual Property Office, the disclosure of which is incorporated herein by reference.

BACKGROUND OF THE DISCLOSURE

Field of the Disclosure

The present disclosure relates to a technical idea of reducing the surface temperature of a material or temperature under a material by emitting heat under a device to the outside by absorbing and emitting long-wavelength infrared light corresponding to the wavelength range of the atmospheric window while minimizing absorption of light of the solar spectrum. More particularly, the present disclosure relates to a technology for providing a radiative cooling device having a multilayer structure that is capable of increasing sunlight reflection through differences in the refractive indexes of the device-forming materials while performing selective emission over the wavelength range of the atmospheric window using a radiative cooling device having a multilayer structure composed of polymers and inorganic materials.

Description of the Related Art

A passive radiative cooling device may be passively cooled by reflecting wavelengths (0.3 to 2.5 μm) corresponding to daytime sunlight and emitting the energy of radiant heat (8 to 13 μm) that can escape into space.

Meanwhile, a passive radiative heating device may be passively heated by absorbing wavelengths (0.3 to 2.5 μm) corresponding to daytime sunlight and not absorbing the energy of radiant heat (8 to 13 μm) that can escape into space.

The efficiency of a passive cooling device may be checked by measuring the optical properties of the device.

To emit heat, a device must have a high absorptivity or emissivity in a long-wavelength infrared region to emit heat into space.

According to the Planck distribution, heat emission may reach maximum in a wavelength range of 6 to 20 μm at a temperature of 300 K. In the case of the Earth, the wavelength range corresponding to the atmospheric window is in the range of about 8 to 13 μm. Thus, to maximize the heat dissipation capacity of a passive cooling device, the absorptivity or emissivity thereof must reach maximum in the range of 8 to 13 μm.

Infrared radiation in the wavelength range of the atmospheric window plays a key role in achieving radiative cooling by actual heat dissipation.

When 100% of incident sunlight including ultraviolet light, visible light, and near-infrared light emitted from the sun may be reflected and 100% of long-wavelength infrared light of a range of 8 to 13 μm, which is the wavelength range corresponding to the atmospheric window, is emitted to the outside, a cooling performance of 158 W/m$^2$ may be achieved without energy consumption at an ambient temperature of 300 K.

When 95% of sunlight is reflected and 90% or more of mid-infrared light of a range of 8 to 13 μm is emitted to the outside, a cooling performance of 100 W/m$^2$ may be achieved during the day when the ambient temperature is 300 K (that is, with light absorption by the sun), and a cooling performance of 120 W/m$^2$ may be achieved at night when there is no light absorption by the sun.

To be used as a passive radiative cooling material, the material must have high transmittance and reflectance for incident sunlight including ultraviolet light and near-infrared light (UV-vis-NIR) so as not to absorb the incident sunlight, and the material must have a high absorptivity (emissivity) for long-wavelength infrared light of a range of 8 to 13 μm, which is a wavelength range corresponding to the atmospheric window. In addition, the material must have high durability (stability, corrosion resistance) outdoors, must be inexpensive and abundantly present, and must be able to be molded in a large area with an inexpensive and easy process.

Polymer materials generally have a high absorptivity (emissivity) for long-wavelength infrared light, but when left outdoors, polymer materials are easily deteriorated by ultraviolet light and moisture, and lifespan thereof may be shortened.

In addition, since thick polymer materials are broadband emitters having high emissivity for all infrared wavelengths, radiative cooling performance thereof is inferior to selective emitters having high emissivity for the atmospheric window.

For high radiation in the atmospheric window zone, a material having a high extinction coefficient vale in a range of 8 to 13 μm may be used. However, it is difficult to find a material having a high extinction coefficient value in all areas because wavelengths in the 8-13 μm range are broad.

In most materials, when an absorption value is changed due to the bonding of molecules that make up the material, the absorption wavelength range is changed by bonds and resonances that are present in the molecule.

For example, in the case of $Al_2O_3$, this value increases from about 10 μm. In the case of $SiO_2$, it is difficult to satisfy the range of all wavelengths such as 8 to 10 μm. In the case of a thin-film inorganic material, even when the thickness becomes thick, it is difficult to increase absorption beyond the limit of the material.

Even in the case of organic materials, absorption wavelength varies depending on bonds constituting the organic materials. However, in the case of an organic material, when the thickness thereof is about 50 μm or more, the organic material has high absorption at all wavelengths as well as 8 to 13 μm. In theory, when a radiative cooling material absorbs wavelengths other than 8 to 13 μm, the radiative cooling performance thereof is degraded (when ambient temperature is low). Accordingly, to solve this problem, an emitter for a range of 8 to 13 μm is required.

RELATED ART DOCUMENTS

Patent Documents (Patent Document 1) Korean Patent Application Publication No. 10-2019-0130985, "PASSIVE RADIATIVE COOLING STRUCTURE"

(Patent Document 2) Korean Patent No. 10-2036071, "MULTILAYER RADIATIVE COOLING STRUCTURE"

(Patent Document 3) US Patent Application Publication No. 2018/0354848, "PASSIVE RADIATIVE COOLING OF WINDOW STRUCTURES"

(Patent Document 4) US Patent Application Publication No. 2020/0095429, "COATING TO COOL A SURFACE BY PASSIVE RADIATIVE COOLING"

SUMMARY OF THE DISCLOSURE

Therefore, the present disclosure has been made in view of the above problems, and it is an object of the present disclosure to improve the radiative cooling performance of a radiative cooling device by providing a radiative cooling device having maximum emissivity in a wavelength range corresponding to the atmospheric window through a radiative cooling layer having a multilayer structure based on polymers and inorganic materials.

It is another object of the present disclosure to improve the radiative cooling performance of a radiative cooling device by improving reflectance using a metal or an alloy material that has high reflectance for sunlight and constituting a solar reflective layer having excellent chemical stability.

It is still another object of the present disclosure to improve the radiative cooling performance of a radiative cooling device by providing a radiative cooling device that has maximum emissivity in a wavelength range corresponding to the atmospheric window by including a multilayer structure consisting of various layers such as an inorganic layer, a polymer layer, a composite inorganic layer, and an inorganic material-polymer composite layer.

It is still another object of the present disclosure to provide a radiative cooling device capable of realizing high reflectance by using only a multilayer structure without a solar reflective layer, wherein the multilayer structure serves as a solar reflective layer.

It is yet another object of the present disclosure to provide a radiative cooling device capable of cooling the surface temperature of materials used in automobiles and buildings to below ambient temperature without consuming energy during day time when sunlight is incident or even during night time when sunlight is not incident.

In accordance with one aspect of the present disclosure, provided is a radiative cooling device having a multilayer structure, the radiative cooling device including a multilayer structure including at least one pair of at least one of an inorganic layer, a polymer layer, a composite inorganic layer, a composite polymer layer, and an inorganic material-polymer composite layer; and a radiative cooling layer for absorbing and emitting infrared light in a wavelength range corresponding to an atmospheric window while reflecting sunlight based on the multilayer structure.

The multilayer structure may include at least one of a first structure in which the inorganic layer is laminated on the polymer layer, a second structure in which the inorganic layer is laminated on the polymer layer and the polymer layer is laminated thereon, a third structure in which the polymer layer is laminated on the inorganic layer, and a fourth structure in which the polymer layer is laminated on the inorganic layer and the inorganic layer is laminated thereon.

The multilayer structure may include at least one of a first repeat structure in which the first structure is repeatedly laminated at least once, a second repeat structure in which the second structure is repeatedly laminated at least once, a third repeat structure in which the third structure is repeatedly laminated at least once, and a fourth repeat structure in which the fourth structure is repeatedly laminated at least once.

The multilayer structure may include at least one of a fifth structure in which the inorganic layer is laminated on the polymer layer and a polymer layer based on a polymer different from a polymer forming the polymer layer is laminated thereon, and a sixth structure in which the polymer layer is laminated on the inorganic layer and an inorganic layer based on an inorganic material different from an inorganic material forming the inorganic layer is laminated thereon.

The multilayer structure may include at least one of a fifth repeat structure in which the fifth structure is repeatedly laminated at least once and a sixth repeat structure in which the sixth structure is repeatedly laminated at least once.

The multilayer structure may include at least one of a seventh structure in which the inorganic layer is laminated on the inorganic material-polymer composite layer and the inorganic material-polymer composite layer is laminated thereon, an eighth structure in which the inorganic layer is laminated on the inorganic material-polymer composite layer and an inorganic material-polymer composite layer including inorganic particles different from inorganic particles included in the inorganic material-polymer composite layer is laminated thereon, a ninth structure in which the inorganic layer is laminated on the inorganic material-polymer composite layer and an inorganic material-polymer composite layer based on a polymer different from a polymer forming the inorganic material-polymer composite layer is laminated thereon, a tenth structure in which the polymer layer is laminated on the composite inorganic layer and the inorganic material-polymer composite layer is laminated thereon, an eleventh structure in which the composite inorganic layer is laminated on the polymer layer and the polymer layer is laminated thereon, and a twelfth structure in which the inorganic layer is laminated on the composite polymer layer and the composite polymer layer is laminated thereon.

The multilayer structure may include at least one of a seventh repeat structure in which the seventh structure is repeatedly laminated at least once, an eighth repeat structure in which the eighth structure is repeatedly laminated at least once, a ninth repeat structure in which the ninth structure is repeatedly laminated at least once, a tenth repeat structure in which the tenth structure is repeatedly laminated at least once, an eleventh repeat structure in which the eleventh structure is repeatedly laminated at least once, and a twelfth repeat structure in which the twelfth structure is repeatedly laminated at least once.

The inorganic layer may be formed of at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

The polymer layer may be formed of at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE).

The inorganic material-polymer composite layer may be formed of a mixture including at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE) and at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

The composite inorganic layer may be formed by mixing any one first inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$ and a second inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$, wherein the second inorganic material is different from the first inorganic material.

The composite polymer layer may be formed by mixing a first polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), and polyethylene (PE), PTFE (Polytetrafluoroethylene), Spectralon, ETFE (Ethylene Tetra fluoro Ethylene), and a second polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE), wherein the second polymer is different from the first polymer.

The radiative cooling device having a multilayer structure according to one embodiment of the present disclosure may further include a solar reflective layer formed of at least one of a metal material, at least one inorganic particle, and a polymer including the inorganic particle and responsible of reflecting sunlight.

The solar reflective layer may be formed of at least one metal material selected from silver (Ag), aluminum (Al), gold (Au), copper (Cu), titanium (Ti), chromium (Cr), manganese (Mn), iron (Fe), and platinum (Pt) or an alloy material prepared by combining two or more metal materials selected therefrom.

The solar reflective layer may be formed of at least one inorganic particle of $MgF_2$, $Al_2O_3$, $SiO_2$, MgO, ZnO, $CaCO_3$, AlN, $MgPHO_4$, and $TiO_2$ or a polymer including the inorganic particle, wherein the polymer includes at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE), wherein the solar reflective layer reflects sunlight based on differences in refractive indexes of the inorganic particle.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1A:
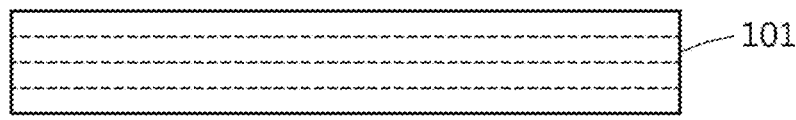
FIGS. 1A and 1B are drawings for explaining radiative cooling devices having a multilayer structure according to one embodiment of the present disclosure.

Hereinafter, the embodiments of the present disclosure will be described in detail with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless otherwise mentioned or clearly inferred from context, the expression "x uses a or b" means any one of natural inclusive permutations.

Terms, such as "unit" or "module", etc., should be understood as a unit that processes at least one function or operation and that may be embodied in a hardware manner, a software manner, or a combination of the hardware manner and the software manner.

Figure 1B:
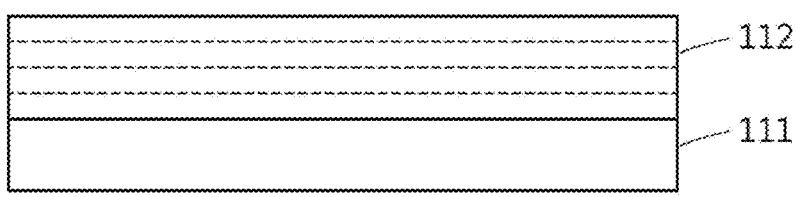

FIGS. 1A and 1B are drawings for explaining radiative cooling devices having a multilayer structure according to one embodiment of the present disclosure.

FIG. 1A illustrates a radiative cooling device having a multilayer structure without a solar reflective layer according to one embodiment of the present disclosure. Hereinafter, for convenience of description, a radiative cooling device 100 having a multilayer structure will be denoted as a radiative cooling device 100. Referring to FIG. 1A, the radiative cooling device 100 includes a radiative cooling layer 101.

The radiative cooling layer 101 according to one embodiment of the present disclosure has a multilayer structure including at least one pair of at least one of an inorganic layer, a polymer layer, a composite inorganic layer, a composite polymer layer, and an inorganic material-polymer composite layer. Accordingly, based on the multilayer structure, the radiative cooling layer 101 may absorb and emit infrared light in a wavelength range corresponding to the atmospheric window while reflecting sunlight.

For example, the radiative cooling layer 101 is composed of a plurality of layers of a plurality of materials, and thus may exhibit high infrared light emissivity in a wavelength range corresponding to the atmospheric window while reflecting sunlight.

The radiative cooling layer 101 according to one embodiment of the present disclosure may reflect sunlight based on differences in the refractive indexes of materials forming the multilayer structure, and thus, may absorb and emit long-wavelength infrared light in a wavelength range corresponding to the atmospheric window while serving as a solar reflective layer.

For example, the multilayer structure including at least one pair of an inorganic layer, a polymer layer, a composite inorganic layer, a composite polymer layer, and an inorganic material-polymer composite layer of the radiative cooling layer 101 will be further explained with reference to FIGS. 2A to 5F.

According to an embodiment of the present disclosure, the multilayer structure of the radiative cooling layer 101 may include at least one of a first structure in which the inorganic layer is laminated on the polymer layer, a second structure in which the inorganic layer is laminated on the polymer layer and the polymer layer is laminated thereon, a third structure in which the polymer layer is laminated on the inorganic layer, and a fourth structure in which the polymer layer is laminated on the inorganic layer and the inorganic layer is laminated thereon.

For example, the multilayer structure of the radiative cooling layer 101 may include at least one of a first repeat structure in which the first structure is repeatedly laminated at least once, a second repeat structure in which the second structure is repeatedly laminated at least once, a third repeat structure in which the third structure is repeatedly laminated at least once, and a fourth repeat structure in which the fourth structure is repeatedly laminated at least once.

The multilayer structure of the radiative cooling layer 101 according to one embodiment of the present disclosure may include at least one of a fifth structure in which the inorganic layer is laminated on the polymer layer and a polymer layer based on a polymer different from a polymer forming the polymer layer is laminated thereon and a sixth structure in which the polymer layer is laminated on the inorganic layer and an inorganic layer based on an inorganic material different from an inorganic material forming the inorganic layer is laminated thereon.

For example, the multilayer structure of the radiative cooling layer 101 may include at least one of a fifth repeat structure in which the fifth structure is repeatedly laminated at least once and a sixth repeat structure in which the sixth structure is repeatedly laminated at least once.

According to an embodiment of the present disclosure, the multilayer structure of the radiative cooling layer 101 may include at least one of a seventh structure in which the inorganic layer is laminated on the inorganic material-polymer composite layer and the inorganic material-polymer composite layer is laminated thereon, an eighth structure in which the inorganic layer is laminated on the inorganic material-polymer composite layer and an inorganic material-polymer composite layer including inorganic particles different from inorganic particles included in the inorganic material-polymer composite layer is laminated thereon, a ninth structure in which the inorganic layer is laminated on the inorganic material-polymer composite layer and an inorganic material-polymer composite layer based on a polymer different from a polymer forming the inorganic material-polymer composite layer is laminated thereon, a tenth structure in which the polymer layer is laminated on the composite inorganic layer and the inorganic material-polymer composite layer is laminated thereon, an eleventh structure in which the composite inorganic layer is laminated on the polymer layer and the polymer layer is laminated thereon, and a twelfth structure in which the inorganic layer is laminated on the composite polymer layer and the composite polymer layer is laminated thereon.

For example, the multilayer structure of the radiative cooling layer 101 may include at least one of a seventh repeat structure in which the seventh structure is repeatedly laminated at least once, an eighth repeat structure in which the eighth structure is repeatedly laminated at least once, a ninth repeat structure in which the ninth structure is repeatedly laminated at least once, a tenth repeat structure in which the tenth structure is repeatedly laminated at least once, an eleventh repeat structure in which the eleventh structure is repeatedly laminated at least once, and a twelfth repeat structure in which the twelfth structure is repeatedly laminated at least once.

In the above description, the multilayer structure of the radiative cooling layer 101 is exemplified as having the first or twelfth structure and the first or twelfth repeat structure in which the first or twelfth structure is repeated laminated, but the multilayer structure may have various structures without being limited thereto.

For example, in the multilayer structure, functions of sunlight reflection and selective emission may be performed in consideration of the refractive index of a polymer or an inorganic material configured to increase sunlight reflection.

For example, the multilayer structure may be formed so that the refractive index of each layer of the multilayer structure is adjusted according to a material forming each layer. Thereby, a radiative cooling device having a high selective emission function and having low absorption and high reflectivity for sunlight may be manufactured.

For example, the selective emission function may be a function of absorbing and emitting long-wavelength infrared light in a wavelength range corresponding to the atmospheric window.

In addition, based on differences in the refractive indexes of a polymer or an inorganic material included in each layer of the multilayer structure, the multilayer structure may be changed to a structure that is advantageous for reflecting sunlight and emitting and absorbing infrared light in a wavelength range corresponding to the atmospheric window.

According to an embodiment of the present disclosure, the inorganic layer constituting the radiative cooling layer 101 may be formed of at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

For example, the inorganic layer may be formed using spin coating, bar coating, dip-coating, spray coating, or vacuum evaporation.

For example, the polymer layer constituting the radiative cooling layer 101 may be formed of at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE).

For example, the polymer layer may be formed by mixing a polymer and a solvent and subjecting the mixture to spin coating, bar coating, dip-coating, or spray coating.

According to an embodiment of the present disclosure, the inorganic material-polymer composite layer constituting the radiative cooling layer 101 may be formed of a mixture including at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE) and at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

For example, the composite inorganic layer of the radiative cooling layer 101 may be formed by mixing any one first inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$ and a second inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$. In this case, the second inorganic material is different from the first inorganic material.

According to an embodiment of the present disclosure, the composite polymer layer constituting the radiative cooling layer 101 may be formed by mixing a first polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), and polyethylene (PE) and a second polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE). In this case, the second polymer is different from the first polymer.

The present disclosure may provide a radiative cooling device capable of realizing high reflectance by using only a multilayer structure without a solar reflective layer, wherein the multilayer structure serves as a solar reflective layer.

FIG. 1B illustrates a radiative cooling device having a multilayer structure including a solar reflective layer according to one embodiment of the present disclosure.

Referring to FIG. 1B, a radiative cooling device 110 having a multilayer structure according to one embodiment of the present disclosure includes a solar reflective layer 111 and a radiative cooling layer 112. Hereinafter, for convenience of description, the radiative cooling device 110 having a multilayer structure will be denoted as the radiative cooling device 110.

The solar reflective layer 111 according to one embodiment of the present disclosure may be formed of any one of a metal material, at least one inorganic particle, and a polymer including the inorganic particle, and may reflect sunlight.

For example, the solar reflective layer 111 may be formed of at least one metal material selected from silver (Ag), aluminum (Al), gold (Au), copper (Cu), titanium (Ti), chromium (Cr), manganese (Mn), iron (Fe), and platinum (Pt) or an alloy material prepared by combining two or more metal materials selected therefrom.

In addition, the solar reflective layer 111 is formed of at least one inorganic particle of $MgF_2$, $Al_2O_3$, $SiO_2$, MgO, ZnO, $CaCO_3$, AlN, $MgPHO_4$, and $TiO_2$ or a polymer including the inorganic particle, wherein the polymer includes at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE). Accordingly, the solar reflective layer 111 may reflect sunlight based on differences in the refractive indexes of the inorganic particle.

That is, the solar reflective layer 111 may be formed in any one of a white reflective film formed of inorganic particles that are advantageous for scattering and reflecting sunlight, a reflective film formed of at least one polymer particle, and a reflective film formed based on a mixture prepared by including at least one inorganic particle in a thin film polymer.

Accordingly, the present disclosure may improve the radiative cooling performance of a radiative cooling device by improving reflectance using a metal or an alloy material that has high reflectance for sunlight and constituting a solar reflective layer having excellent chemical stability.

According to an embodiment of the present disclosure, the radiative cooling layer 112 is formed on a solar reflective layer and is formed to have a multilayer structure including at least one pair of at least one of an inorganic layer, a polymer layer, a composite inorganic layer, a composite polymer layer, and an inorganic material-polymer composite layer. Accordingly, based on the multilayer structure, the radiative cooling layer 112 may absorb and emit infrared light in a wavelength range corresponding to the atmospheric window.

That is, the radiative cooling layer 112 is composed of a plurality of layers of a plurality of materials. Accordingly, the radiative cooling layer 112 may exhibit high infrared light emissivity in a wavelength range corresponding to the atmospheric window. For example, the radiative cooling layer 112 may be referred to as infrared light emission layers.

For example, the radiative cooling layer 112 having a multilayer structure in which an inorganic layer and a polymer layer form a pair will be further explained with reference to FIGS. 2A to 5F.

According to an embodiment of the present disclosure, the multilayer structure may include at least one of a first structure in which the inorganic layer is laminated on the polymer layer, a second structure in which the inorganic layer is laminated on the polymer layer and the polymer layer is laminated thereon, a third structure in which the polymer layer is laminated on the inorganic layer, and a fourth structure in which the polymer layer is laminated on the inorganic layer and the inorganic layer is laminated thereon.

For example, the multilayer structure of the radiative cooling layer 112 may include at least one of a first repeat structure in which the first structure is repeatedly laminated at least once, a second repeat structure in which the second structure is repeatedly laminated at least once, a third repeat structure in which the third structure is repeatedly laminated at least once, and a fourth repeat structure in which the fourth structure is repeatedly laminated at least once.

The multilayer structure of the radiative cooling layer 112 according to one embodiment of the present disclosure may include at least one of a fifth structure in which the inorganic layer is laminated on the polymer layer and a polymer layer based on a polymer different from a polymer forming the polymer layer is laminated thereon and a sixth structure in which the polymer layer is laminated on the inorganic layer and an inorganic layer based on an inorganic material different from an inorganic material forming the inorganic layer is laminated thereon.

For example, the multilayer structure of the radiative cooling layer 112 may include at least one of a fifth repeat structure in which the fifth structure is repeatedly laminated at least once and a sixth repeat structure in which the sixth structure is repeatedly laminated at least once.

According to an embodiment of the present disclosure, the multilayer structure of the radiative cooling layer 112 may include at least one of a seventh structure in which the inorganic layer is laminated on the inorganic material-polymer composite layer and the inorganic material-polymer composite layer is laminated thereon, an eighth structure in which the inorganic layer is laminated on the inorganic material-polymer composite layer and an inorganic material-polymer composite layer including inorganic particles different from inorganic particles included in the inorganic material-polymer composite layer is laminated thereon, a ninth structure in which the inorganic layer is laminated on the inorganic material-polymer composite layer and an inorganic material-polymer composite layer based on a polymer different from a polymer forming the inorganic material-polymer composite layer is laminated thereon, a tenth structure in which the polymer layer is laminated on the composite inorganic layer and the inorganic material-polymer composite layer is laminated thereon, an eleventh structure in which the composite inorganic layer is laminated on the polymer layer and the polymer layer is laminated thereon, and a twelfth structure in which the inorganic layer is laminated on the composite polymer layer and the composite polymer layer is laminated thereon.

For example, the multilayer structure of the radiative cooling layer 112 may include at least one of a seventh repeat structure in which the seventh structure is repeatedly laminated at least once, an eighth repeat structure in which the eighth structure is repeatedly laminated at least once, a ninth repeat structure in which the ninth structure is repeatedly laminated at least once, a tenth repeat structure in which the tenth structure is repeatedly laminated at least once, an eleventh repeat structure in which the eleventh structure is repeatedly laminated at least once, and a twelfth repeat structure in which the twelfth structure is repeatedly laminated at least once.

In the above description, the multilayer structure of the radiative cooling layer 112 is exemplified as having the first or twelfth structure and the first or twelfth repeat structure in which the first or twelfth structure is repeated laminated, but the multilayer structure may have various structures without being limited thereto.

For example, in the multilayer structure, functions of sunlight reflection and selective emission may be performed in consideration of the refractive index of a polymer or an inorganic material configured to increase sunlight reflection.

For example, the multilayer structure may be formed so that the refractive index of each layer of the multilayer structure is adjusted according to a material forming each layer. Thereby, a radiative cooling device having a high selective emission function and having low absorption and high reflectivity for sunlight may be manufactured.

For example, the selective emission function may be a function of absorbing and emitting long-wavelength infrared light in a wavelength range corresponding to the atmospheric window.

In addition, based on differences in the refractive indexes of a polymer or an inorganic material included in each layer of the multilayer structure, the multilayer structure may be changed to a structure that is advantageous for reflecting sunlight and emitting and absorbing infrared light in a wavelength range corresponding to the atmospheric window.

According to an embodiment of the present disclosure, the inorganic layer constituting the radiative cooling layer 112 may be formed of at least one inorganic material of $Al_2O_3$, $SiO_2$, $BaSO_4$, $LiF$, $CaSO_4$, $ZnO$, $TiO_2$, $ZrO_2$, $CaF_2$, $MgF_2$, $HfO_2$, $CaCO_3$, $AlN$, $MgPHO_4$, and $Si_3N_4$.

For example, the inorganic layer may be formed using spin coating, bar coating, dip-coating, spray coating, or vacuum evaporation.

For example, the polymer layer constituting the radiative cooling layer 112 may be formed of at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE).

For example, the polymer layer may be formed by mixing a polymer and a solvent and subjecting the mixture to spin coating, bar coating, dip-coating, or spray coating.

According to an embodiment of the present disclosure, the inorganic material-polymer composite layer constituting the radiative cooling layer 112 may be formed of a mixture including at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE) and at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

For example, the composite inorganic layer of the radiative cooling layer 112 may be formed by mixing any one first inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$ and a second inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$. In this case, the second inorganic material is different from the first inorganic material.

According to an embodiment of the present disclosure, the composite polymer layer constituting the radiative cooling layer 112 may be formed by mixing a first polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), and polyethylene (PE) and a second polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE (Polytetrafluoroethylene), Spectralon, ETFE (Ethylene Tetra fluoro Ethylene), and polyethylene (PE). In this case, the second polymer is different from the first polymer.

Accordingly, the present disclosure may improve the radiative cooling performance of a radiative cooling device by providing a radiative cooling device having maximum emissivity in a wavelength range corresponding to the atmospheric window through a radiative cooling layer having a multilayer structure based on polymers and inorganic materials.

FIGS. 2A to 2D are drawings for explaining radiative cooling devices having a multilayer structure based on polymer layers and inorganic layers according to one embodiment of the present disclosure.

FIGS. 2A to 2D illustrate radiative cooling devices, in which a radiative cooling layer is composed of a multilayer structure including polymer layers and inorganic layers according to one embodiment of the present disclosure.

Figure 2A:
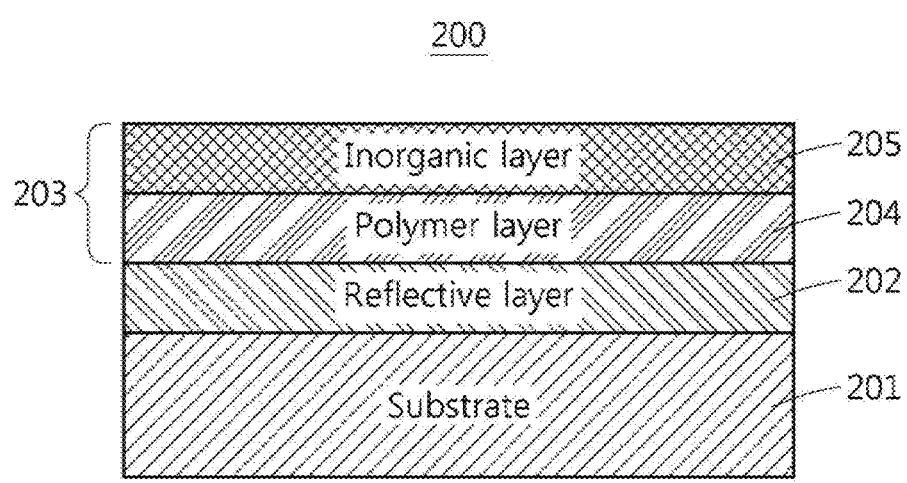
FIGS. 2A to 2D are drawings for explaining radiative cooling devices having a multilayer structure based on polymer layers and inorganic layers according to one embodiment of the present disclosure.

Referring to FIG. 2A, a radiative cooling device 200 includes a substrate 201, a solar reflective layer 202, and a radiative cooling layer 203.

The radiative cooling layer 203 according to one embodiment of the present disclosure has a multilayer structure in which a polymer layer 204 is laminated on the solar reflective layer 202 and an inorganic layer 205 is laminated on the polymer layer 204.

For example, the radiative cooling layer 203 may correspond to the first structure described in FIG. 1.

According to an embodiment of the present disclosure, the radiative cooling layer 203 may have a multilayer structure of a first repeat structure in which the first structure is repeatedly laminated at least once.

Figure 2B:
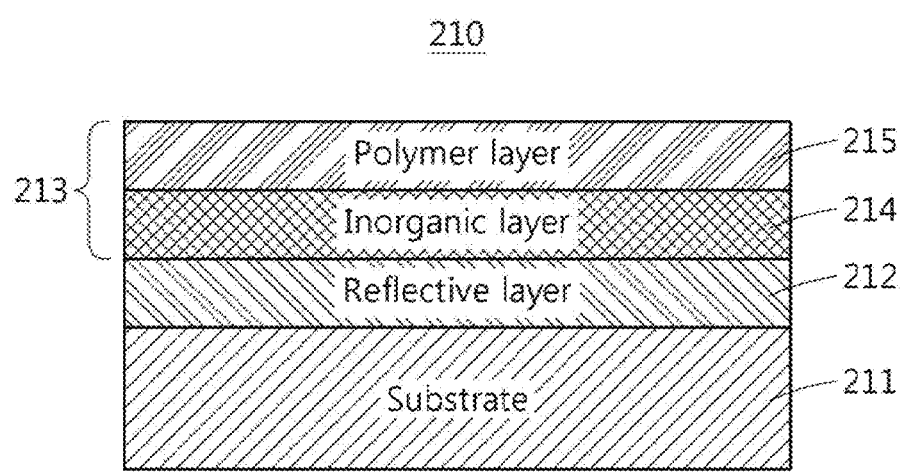

Referring to FIG. 2B, a radiative cooling device 210 includes a substrate 211, a solar reflective layer 212, and a radiative cooling layer 213.

The radiative cooling layer 213 according to one embodiment of the present disclosure has a multilayer structure in which an inorganic layer 214 is laminated on the solar reflective layer 212 and a polymer layer 215 is laminated on the inorganic layer 214.

For example, the radiative cooling layer 213 may correspond to the second structure described in FIG. 1.

According to an embodiment of the present disclosure, the radiative cooling layer 213 may have a multilayer structure of a second repeat structure in which the second structure is repeatedly laminated at least once.

Figure 2C:
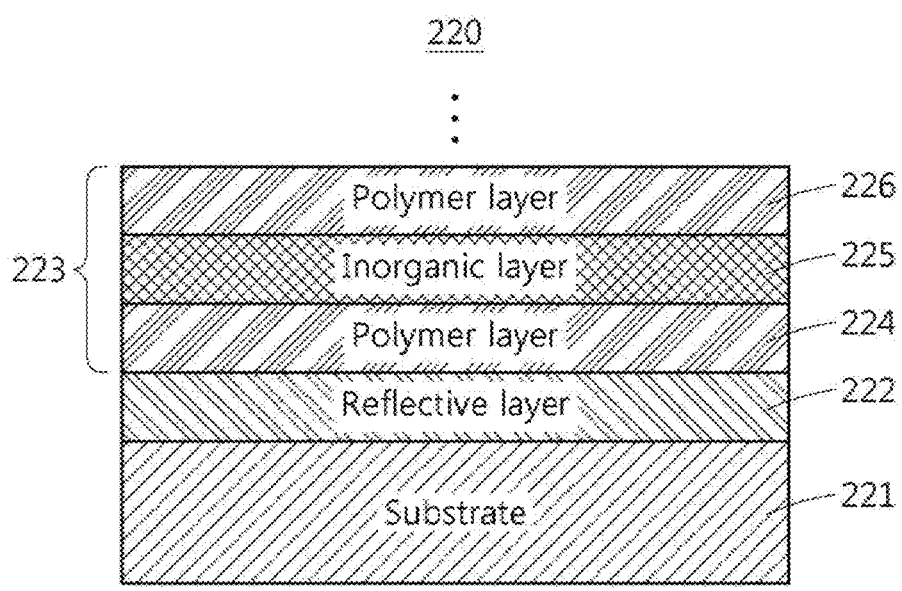

Referring to FIG. 2C, a radiative cooling device 220 includes a substrate 221, a solar reflective layer 222, and a radiative cooling layer 223.

The radiative cooling layer 223 according to one embodiment of the present disclosure has a multilayer structure in which a polymer layer 224 is laminated on the solar reflective layer 222, an inorganic layer 225 is laminated on the polymer layer 224, and a polymer layer 226 is laminated on the inorganic layer 225.

In this case, the polymer layer 224 and the polymer layer 226 may be formed using the same polymer.

For example, the radiative cooling layer 223 may correspond to the third structure described in FIG. 1.

According to an embodiment of the present disclosure, the radiative cooling layer 223 may have a multilayer structure of a third repeat structure in which the third structure is repeatedly laminated at least once.

Figure 2D:
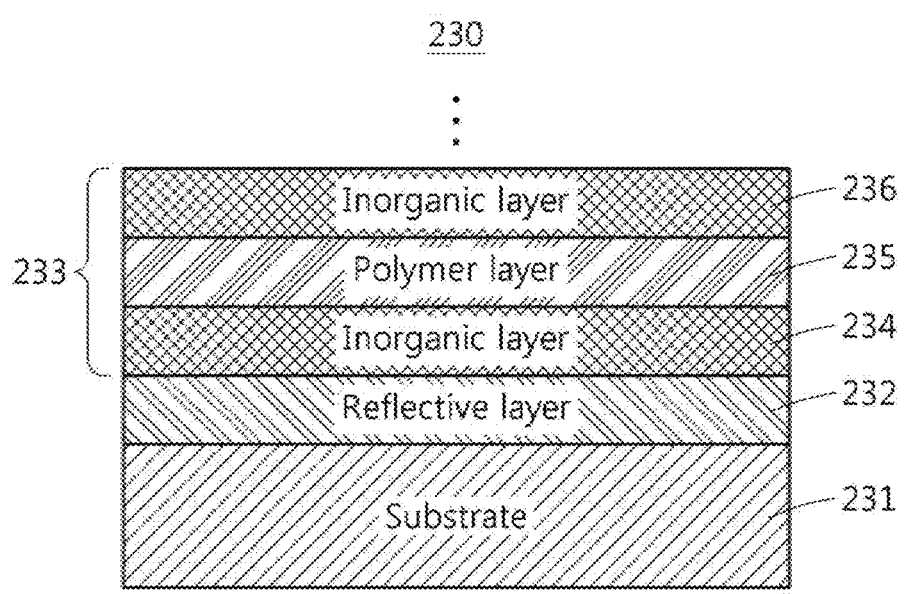

Referring to FIG. 2D, a radiative cooling device 230 includes a substrate 231, a solar reflective layer 232, and a radiative cooling layer 233.

The radiative cooling layer 233 according to one embodiment of the present disclosure has a multilayer structure in which an inorganic layer 234 is laminated on the solar reflective layer 232, a polymer layer 235 is laminated on the inorganic layer 234, and an inorganic layer 236 is laminated on the polymer layer 235.

In this case, the inorganic layer 234 and the inorganic layer 236 may be formed using the same inorganic material or inorganic particles.

For example, the radiative cooling layer 233 may correspond to the fourth structure described in FIG. 1.

According to an embodiment of the present disclosure, the radiative cooling layer 233 may have a multilayer structure of a fourth repeat structure in which the fourth structure is repeatedly laminated at least once.

Figure 3A:
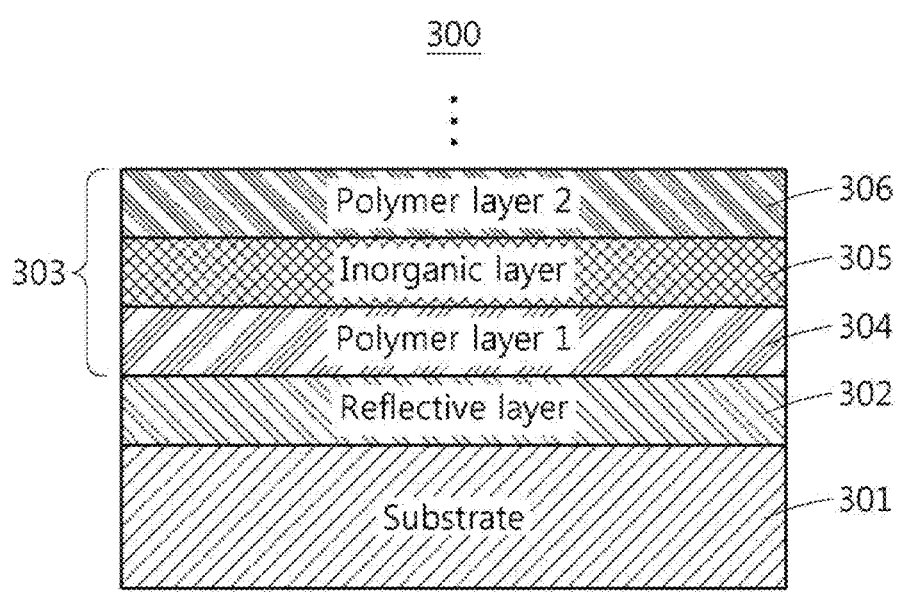
FIGS. 3A and 3B are drawings for explaining radiative cooling devices having a multilayer structure based on one or more polymer layers and one or more inorganic layers according to one embodiment of the present disclosure.
Figure 3B:
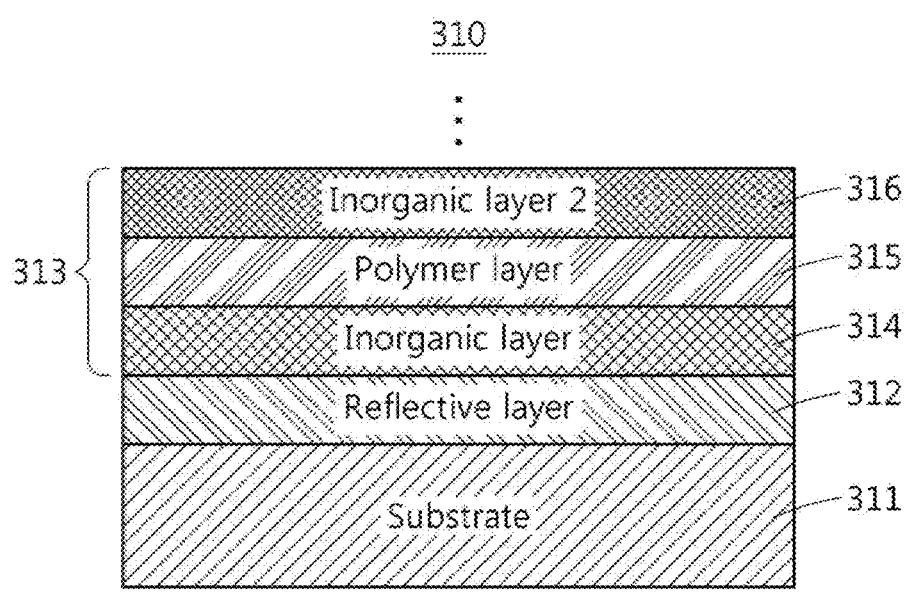

FIGS. 3A and 3B are drawings for explaining radiative cooling devices having a multilayer structure based on one or more polymer layers and one or more inorganic layers according to one embodiment of the present disclosure.

FIGS. 3A and 3B illustrate radiative cooling devices having a multilayer structure based on one or more polymer layers formed using one or more different types of polymers and one or more inorganic layers formed using one or more different types of inorganic materials or inorganic particles according to one embodiment of the present disclosure.

Referring to FIG. 3A, a radiative cooling device 300 includes a substrate 301, a solar reflective layer 302, and a radiative cooling layer 303.

The radiative cooling layer 303 according to one embodiment of the present disclosure has a multilayer structure in which a polymer layer 304 is laminated on the solar reflective layer 302, an inorganic layer 305 is laminated on the polymer layer 304, and a polymer layer 306 is laminated on the inorganic layer 305.

In this case, the polymer layer 304 and the polymer layer 306 may be formed using different polymers.

For example, the radiative cooling layer 303 may correspond to the fifth structure described in FIG. 1.

According to an embodiment of the present disclosure, the radiative cooling layer 303 may have a multilayer structure of a fifth repeat structure in which the fifth structure is repeatedly laminated at least once.

Referring to FIG. 3B, a radiative cooling device 310 includes a substrate 311, a solar reflective layer 312, and a radiative cooling layer 313.

The radiative cooling layer 313 according to one embodiment of the present disclosure has a multilayer structure in which an inorganic layer 314 is laminated on the solar reflective layer 312, a polymer layer 315 is laminated on the inorganic layer 314, and an inorganic layer 316 is laminated on the polymer layer 315.

In this case, the inorganic layer 314 and the inorganic layer 316 may be formed using different inorganic materials or inorganic particles.

For example, the radiative cooling layer 313 may correspond to the sixth structure described in FIG. 1.

According to an embodiment of the present disclosure, the radiative cooling layer 313 may have a multilayer structure of a sixth repeat structure in which the sixth structure is repeatedly laminated at least once.

Figure 4A:
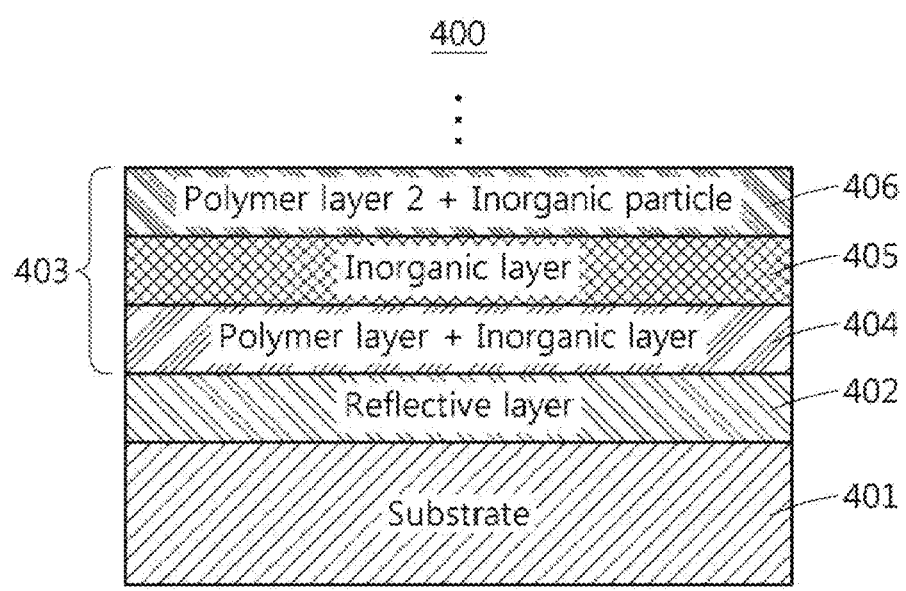
FIGS. 4A and 4C are drawings for explaining radiative cooling devices having a multilayer structure based on a polymer layer, an inorganic layer, a composite polymer layer, a composite inorganic layer, and an inorganic material-polymer composite layer according to one embodiment of the present disclosure.
Figure 4B:
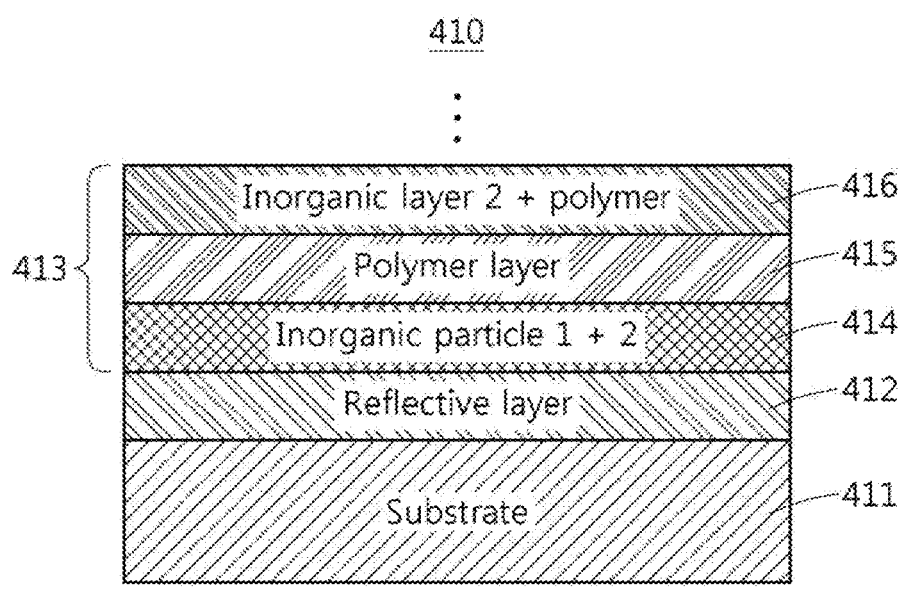
Figure 4C:
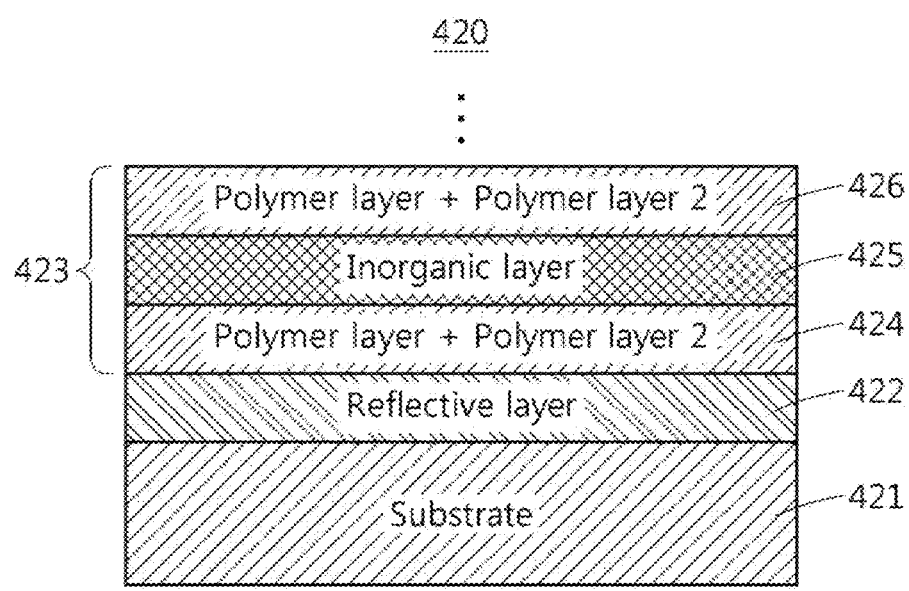

FIGS. 4A and 4C are drawings for explaining radiative cooling devices having a multilayer structure based on a polymer layer, an inorganic layer, a composite polymer layer, a composite inorganic layer, and an inorganic material-polymer composite layer according to one embodiment of the present disclosure.

Referring to FIG. 4A, a radiative cooling device 400 includes a substrate 401, a solar reflective layer 402, and a radiative cooling layer 403.

The radiative cooling layer 403 according to one embodiment of the present disclosure has a multilayer structure in which an inorganic material-polymer composite layer 404 is laminated on the solar reflective layer 402, an inorganic layer 405 is laminated on the inorganic material-polymer composite layer 404, and an inorganic material-polymer composite layer 406 is laminated on the inorganic layer 405.

In this case, the inorganic material-polymer composite layer 404 and the inorganic material-polymer composite layer 406 may be formed based on different polymers.

For example, the radiative cooling layer 403 may correspond to the seventh structure described in FIG. 2.

According to an embodiment of the present disclosure, the radiative cooling layer 403 may have a multilayer structure of a seventh repeat structure in which the seventh structure is repeatedly laminated at least once.

For example, the inorganic material-polymer composite layer 404 and the inorganic material-polymer composite layer 406 may be formed using different inorganic particles. In this case, the radiative cooling layer 403 may correspond to the eighth structure described in FIG. 2.

In addition, the radiative cooling layer 403 may have a multilayer structure of an eighth repeat structure in which the eighth structure is repeatedly laminated at least once.

Referring to FIG. 4B, a radiative cooling device 410 includes a substrate 411, a solar reflective layer 412, and a radiative cooling layer 413.

The radiative cooling layer 413 according to one embodiment of the present disclosure has a multilayer structure in which a composite inorganic layer 414 is laminated on the solar reflective layer 412, a polymer layer 415 is laminated on the composite inorganic layer 414, and an inorganic material-polymer composite layer 416 is laminated on the polymer layer 415.

In this case, the composite inorganic layer 414 may be formed using a first inorganic material and a second inorganic material that are different from each other, or using first inorganic particles and second inorganic particles.

In addition, the inorganic material-polymer composite layer 416 may be formed using a polymer forming the polymer layer 415 and the second inorganic material or the second inorganic particles forming the composite inorganic layer 414.

According to an embodiment of the present disclosure, the radiative cooling layer 413 may correspond to the tenth structure described in FIG. 2.

In addition, the radiative cooling layer 413 may have a multilayer structure of a tenth repeat structure in which the tenth structure is repeatedly laminated at least once.

According to an embodiment of the present disclosure, the radiative cooling layer 413 may have the ninth structure or the eleventh structure described in FIG. 2 depending on the composition of the composite inorganic layer, the inorganic material-polymer composite layer, the inorganic layer, and the polymer layer.

In addition, the radiative cooling layer 413 may have a multilayer structure of a ninth repeat structure in which the ninth structure is repeatedly laminated at least once, or may have a multilayer structure of an eleventh repeat structure in which the eleventh structure is repeatedly laminated at least once.

Referring to FIG. 4C, the radiative cooling device 210 includes a substrate 421, a solar reflective layer 422, and a radiative cooling layer 423.

The radiative cooling layer 423 according to one embodiment of the present disclosure has a multilayer structure in which a composite polymer layer 424 is laminated on the solar reflective layer 422, an inorganic layer 425 is laminated on the composite polymer layer 424, and a composite polymer layer 426 is laminated on the inorganic layer 425.

In this case, the composite polymer layer 424 may be formed using a first polymer and a second polymer that are different from each other.

According to an embodiment of the present disclosure, the radiative cooling layer 423 may correspond to the twelfth structure described in FIG. 2.

In addition, the radiative cooling layer 423 may have a multilayer structure of a twelfth repeat structure in which the twelfth structure is repeatedly laminated at least once.

FIGS. 5A to 5F show electron microscope images of a radiative cooling device having a multilayer structure according to one embodiment of the present disclosure.

Figure 5A:
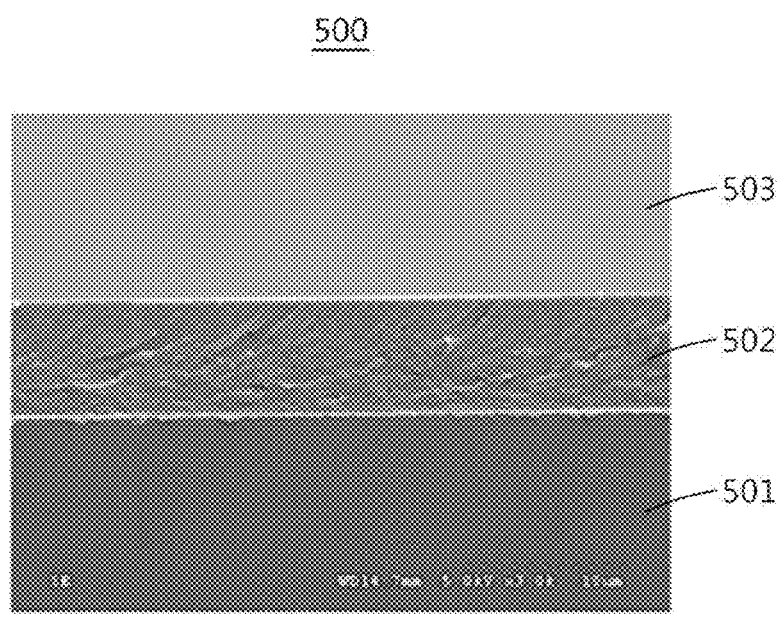
FIGS. 5A to 5F show electron microscope images of a radiative cooling device having a multilayer structure according to one embodiment of the present disclosure.
Figure 5B:
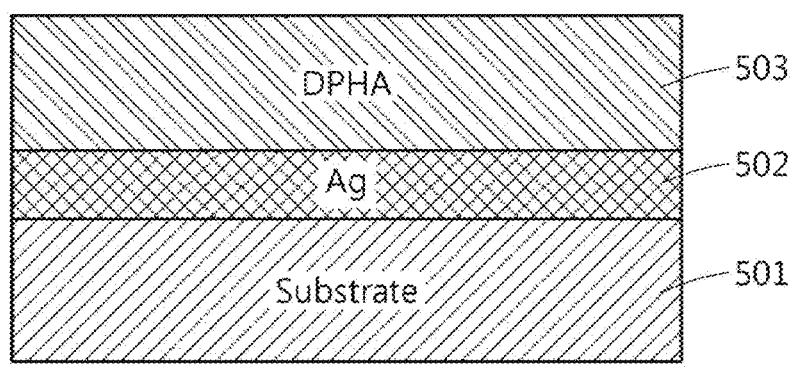

FIGS. 5A and 5B show an electron microscope image and a laminated structure for explaining a radiative cooling device including a single polymer layer.

Referring to FIGS. 5A and 5B, a radiative cooling device 500 includes a substrate 501, a solar reflective layer 502, and a polymer layer 503.

For example, the solar reflective layer 502 may be formed of silver (Ag), which is a metal material, and the polymer layer 503 may be formed of DPHA, which is a polymer.

Figure 5C:
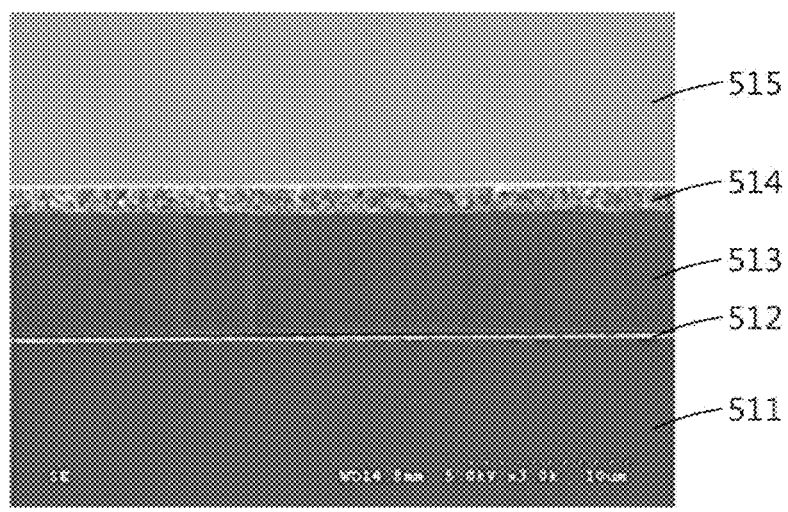
Figure 5D:
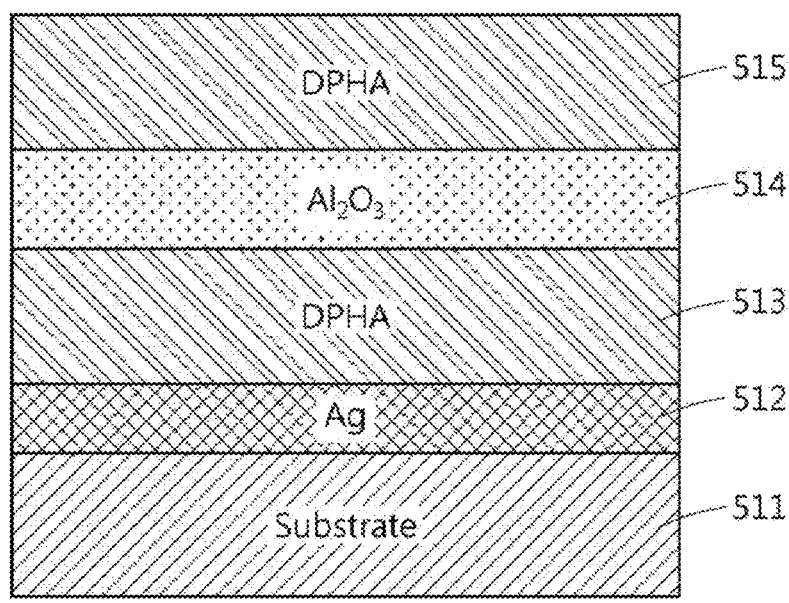

FIGS. 5C and 5D show an electron microscope image and a laminated structure for explaining a radiative cooling device including two polymer layers and one inorganic layer.

Referring to FIGS. 5C and 5D, a radiative cooling device 510 includes a substrate 511, a solar reflective layer 512, a polymer layer 513, an inorganic layer 514, and a polymer layer 515.

For example, the solar reflective layer 512 may be formed of silver (Ag), which is a metal material, the polymer layer 513 and the polymer layer 515 may be formed of DPHA, which is a polymer, and the inorganic layer 514 may be formed of $Al_2O_3$, which is an inorganic material or inorganic particles.

Figure 5E:
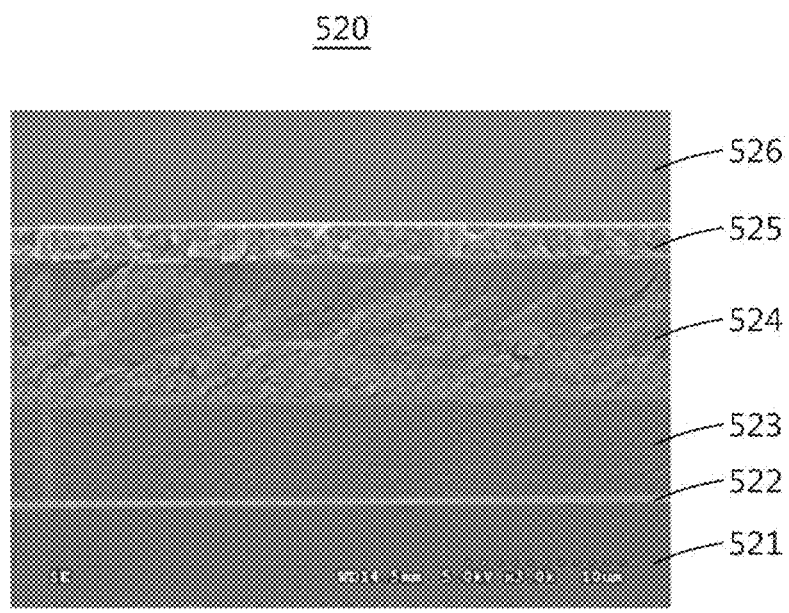
Figure 5F:
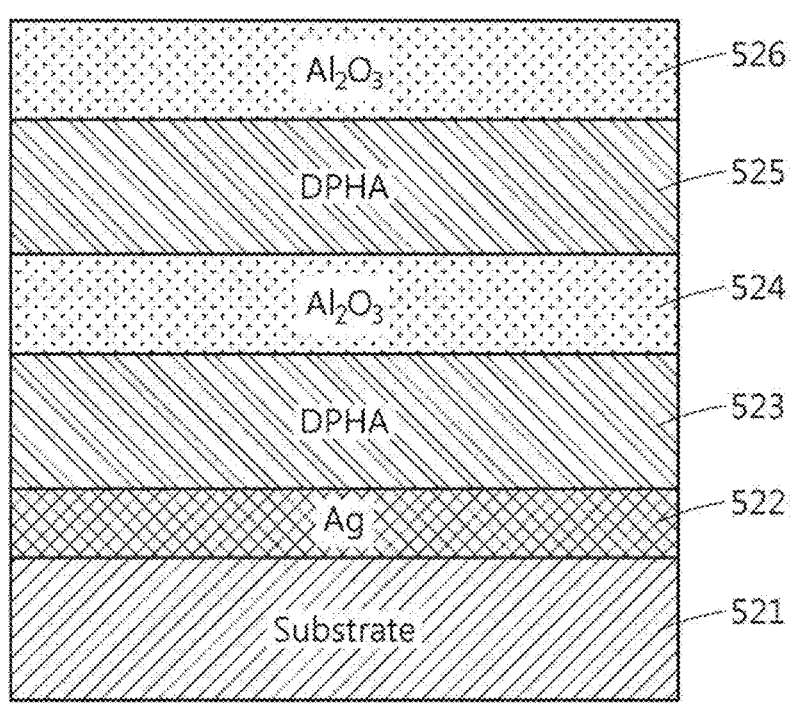

FIGS. 5E and 5F show an electron microscope image and a laminated structure for explaining a radiative cooling device including two polymer layers and two inorganic layers.

Referring to FIGS. 5E and 5F, a radiative cooling device 520 includes a substrate 521, a solar reflective layer 522, a polymer layer 523, an inorganic layer 524, a polymer layer 525, and an inorganic layer 526.

For example, the solar reflective layer 522 may be formed of silver (Ag), which is a metal material, the polymer layer 523 and the polymer layer 525 may be formed of DPHA, which is a polymer, and the inorganic layer 524 and the inorganic layer 526 may be formed of $Al_2O_3$, which is an inorganic material or inorganic particles.

Figure 6A:
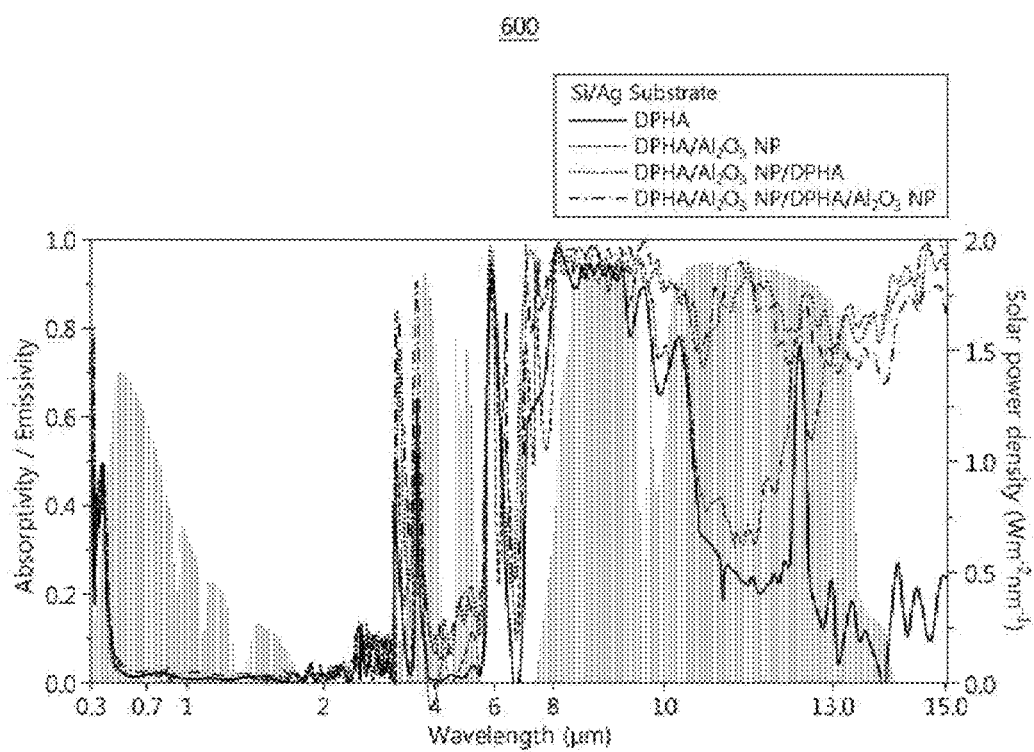
FIGS. 6A to 6C are graphs for explaining the optical properties of a radiative cooling device having a multilayer structure according to one embodiment of the present disclosure.
Figure 6B:
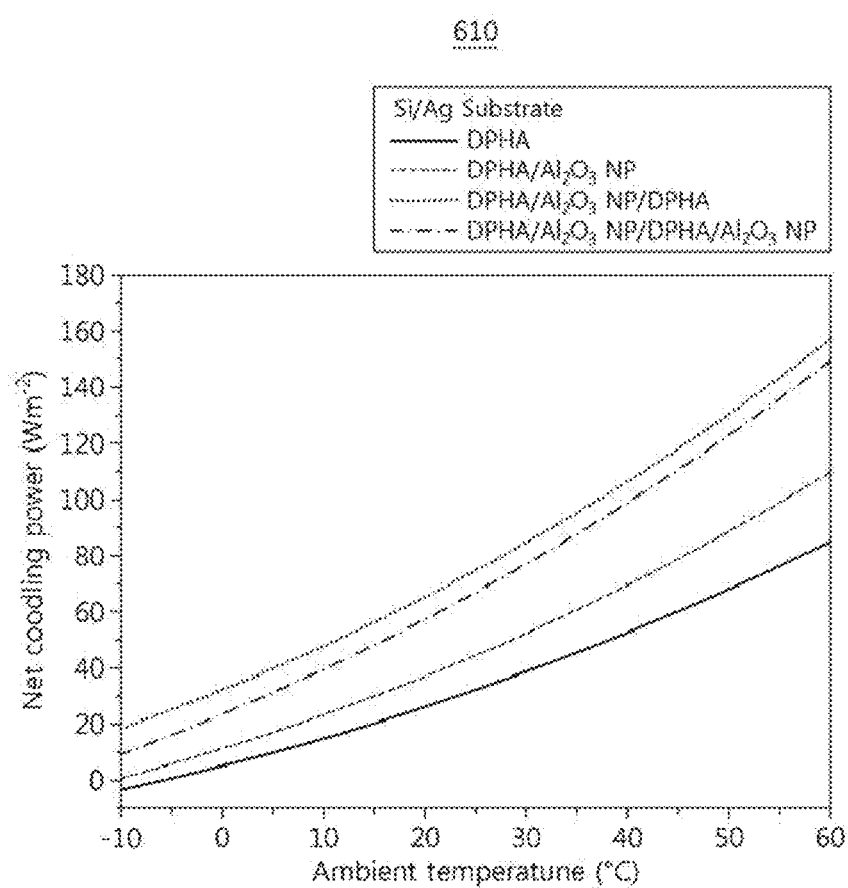
Figure 6C:
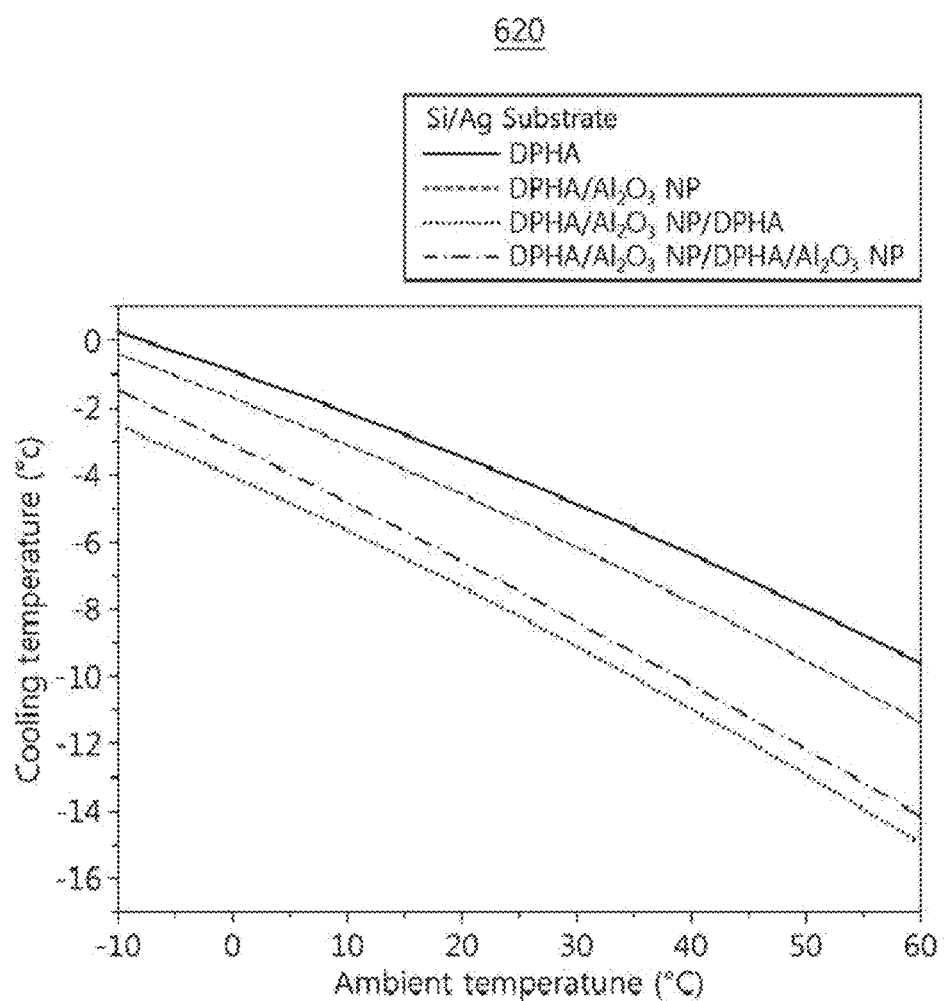

FIGS. 6A to 6C are graphs for explaining the optical properties of a radiative cooling device having a multilayer structure according to one embodiment of the present disclosure.

FIGS. 6A to 6C show the simulation results of a radiative cooling device having a multilayer structure according to one embodiment of the present disclosure in various examples.

Referring to FIG. 6A, a graph 600 shows, depending on change in a sunlight wavelength range, the absorptivity and emissivity of a first radiative cooling device including a DPHA-based polymer layer; a second radiative cooling device having the same configuration as the first radiative cooling device, except that an $Al_2O_3$ nanoparticle (NP)-based inorganic layer is additionally laminated; a third radiative cooling device having the same configuration as the second radiative cooling device, except that a DPHA-based polymer layer is additionally laminated; and a fourth radiative cooling device having the same configuration as the third radiative cooling device, except that an $Al_2O_3$ nanoparticle (NP)-based inorganic layer is additionally laminated.

The first radiative cooling device to the fourth radiative cooling device include a substrate composed of silicon and silver.

Referring to FIG. 6B, a graph 610 shows the net cooling power of the first radiative cooling device to the fourth radiative cooling device depending on ambient temperature change.

Referring to FIG. 6C, a graph 620 shows the cooling temperature of the first radiative cooling device to the fourth radiative cooling device depending on ambient temperature change.

The average absorptivity, average emissivity, total cooling power, and cooling temperature of the first radiative cooling device to the fourth radiative cooling device are summarized in Table 1 below.

TABLE 1

| Temperature (T) = 30° C. Heat transfer coefficient (h) = 6 $Wm^{-2}$ K | First radiative cooling device | Second radiative cooling device | Third radiative cooling device | Fourth radiative cooling device |
|---|---|---|---|---|
| Average absorptivity (0.3 to 2.5 μm) | 0.040 | 0.044 | 0.053 | 0.057 |
| Average emissivity (8 to 13 μm) | 0.548 | 0.675 | 0.875 | 0.882 |
| Total cooling power ($Wm^{-2}$) | 40.1 | 54.4 | 87.2 | 79.0 |
| Cooling temperature (° C.) | −4.89 | −6.16 | −9.22 | −8.32 |

Referring to Table 1, when a radiative cooling layer is designed to have a multilayer structure in which a polymer layer and an inorganic layer are additionally laminated, average emissivity may be increased, and the radiative cooling layer may be excellent in terms of cooling power and cooling temperature.

Accordingly, the present disclosure may improve the radiative cooling performance of a radiative cooling device by providing a radiative cooling device having maximum emissivity in a wavelength range corresponding to the atmospheric window through a radiative cooling layer having a multilayer structure based on polymers and inorganic materials.

In addition, the present disclosure may improve the radiative cooling performance of a radiative cooling device by improving reflectance using a metal or an alloy material that has high reflectance for sunlight and constituting a solar reflective layer having excellent chemical stability.

The present disclosure can improve the radiative cooling performance of a radiative cooling device by providing a radiative cooling device having maximum emissivity in a wavelength range corresponding to the atmospheric window through a radiative cooling layer having a multilayer structure based on polymers and inorganic materials.

The present disclosure can improve the radiative cooling performance of a radiative cooling device by improving reflectance using a metal or an alloy material that has high reflectance for sunlight and constituting a solar reflective layer having excellent chemical stability.

The present disclosure can improve the radiative cooling performance of a radiative cooling device by providing a radiative cooling device that has maximum emissivity in a wavelength range corresponding to the atmospheric window by including a multilayer structure consisting of various layers such as an inorganic layer, a polymer layer, a composite inorganic layer, and an inorganic material-polymer composite layer.

The present disclosure can provide a radiative cooling device capable of realizing high reflectance by using only a multilayer structure without a solar reflective layer, wherein the multilayer structure serves as a solar reflective layer.

The present disclosure can provide a radiative cooling device capable of cooling the surface temperature of materials used in automobiles and buildings to below the ambient temperature without consuming energy during day time when sunlight is incident or even during night time when sunlight is not incident.

In the above-described specific embodiments, elements included in the invention are expressed in singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

DESCRIPTION OF SYMBOLS

100: RADIATIVE COOLING DEVICE
101: RADIATIVE COOLING LAYER

What is claimed is:

1. A radiative cooling device having a multilayer structure, comprising:
  a multilayer structure comprising at least one pair of at least one of an inorganic layer, a polymer layer, a composite inorganic layer, a composite polymer layer, and an inorganic material-polymer composite layer, and
  a radiative cooling layer for absorbing and emitting infrared light in a wavelength range corresponding to an atmospheric window while reflecting sunlight based on the multilayer structure,
  wherein the multilayer structure comprises at least one of a first structure in which the inorganic layer is laminated on the polymer layer and a polymer layer based on a polymer different from a polymer forming the polymer layer is laminated thereon, and a second structure in which the polymer layer is laminated on the inorganic layer and an inorganic layer based on an inorganic material different from an inorganic material forming the inorganic layer is laminated thereon.

2. The radiative cooling device according to claim 1, wherein the multilayer structure comprises at least one of a third structure in which the inorganic layer is laminated on the polymer layer, a fourth structure in which the inorganic layer is laminated on the polymer layer and the polymer layer is laminated thereon, a fifth structure in which the polymer layer is laminated on the inorganic layer, and a sixth structure in which the polymer layer is laminated on the inorganic layer and the inorganic layer is laminated thereon.

3. The radiative cooling device according to claim 2, wherein the multilayer structure comprises at least one of a third repeat structure in which the third structure is repeatedly laminated at least once, a fourth repeat structure in which the fourth structure is repeatedly laminated at least once, a fifth repeat structure in which the fifth structure is repeatedly laminated at least once, and a sixth repeat structure in which the sixth structure is repeatedly laminated at least once.

4. The radiative cooling device according to claim 1, wherein the multilayer structure comprises at least one of a first repeat structure in which the first structure is repeatedly laminated at least once and a second repeat structure in which the second structure is repeatedly laminated at least once.

5. The radiative cooling device according to claim 1, wherein the multilayer structure comprises at least one of a seventh structure in which the inorganic layer is laminated on the inorganic material-polymer composite layer and the inorganic material-polymer composite layer is laminated thereon, an eighth structure in which the inorganic layer is laminated on the inorganic material-polymer composite layer and an inorganic material-polymer composite layer comprising inorganic particles different from inorganic particles comprised in the inorganic material-polymer composite layer is laminated thereon, a ninth structure in which the inorganic layer is laminated on the inorganic material-polymer composite layer and an inorganic material-polymer composite layer based on a polymer different from a polymer forming the inorganic material-polymer composite layer is laminated thereon, a tenth structure in which the polymer layer is laminated on the composite inorganic layer and the inorganic material-polymer composite layer is laminated thereon, an eleventh structure in which the composite inorganic layer is laminated on the polymer layer and the polymer layer is laminated thereon, and a twelfth structure in which the inorganic layer is laminated on the composite polymer layer and the composite polymer layer is laminated thereon.

6. The radiative cooling device according to claim 5, wherein the multilayer structure comprises at least one of a seventh repeat structure in which the seventh structure is repeatedly laminated at least once, an eighth repeat structure in which the eighth structure is repeatedly laminated at least once, a ninth repeat structure in which the ninth structure is repeatedly laminated at least once, a tenth repeat structure in which the tenth structure is repeatedly laminated at least once, an eleventh repeat structure in which the eleventh structure is repeatedly laminated at least once, and a twelfth repeat structure in which the twelfth structure is repeatedly laminated at least once.

7. The radiative cooling device according to claim 1, wherein the inorganic layer is formed of at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

8. The radiative cooling device according to claim 1, wherein the polymer layer is formed of at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE(Polytetrafluoroethylene), Spectralon, ETFE(Ethylene Tetra fluoro Ethylene), and polyethylene (PE).

9. The radiative cooling device according to claim 1, wherein the inorganic material-polymer composite layer is formed of a mixture comprising at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE(Polytetrafluoroethylene), Spectralon, ETFE(Ethylene Tetra fluoro Ethylene), and polyethylene (PE) and at least one inorganic material of $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$.

10. The radiative cooling device according to claim 1, wherein the composite inorganic layer is formed by mixing any one first inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$ and a second inorganic material selected from $Al_2O_3$, $SiO_2$, $BaSO_4$, LiF, $CaSO_4$, ZnO, $TiO_2$, $ZrO_2$, $CaF_2$, $MgF_2$, $HfO_2$, $CaCO_3$, AlN, $MgPHO_4$, and $Si_3N_4$, wherein the second inorganic material is different from the first inorganic material.

11. The radiative cooling device according to claim 1, wherein the composite polymer layer is formed by mixing a first polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE(Polytetrafluoroethylene), Spectralon, ETFE(Ethylene Tetra fluoro Ethylene), and polyethylene (PE) and a second polymer selected from polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE(Polytetrafluoroethylene), Spectralon, ETFE(Ethylene Tetra fluoro Ethylene), and polyethylene (PE), wherein the second polymer is different from the first polymer.

12. The radiative cooling device according to claim 1, further comprising a solar reflective layer formed of at least one of a metal material, at least one inorganic particle, and a polymer comprising the inorganic particle and responsible for reflecting sunlight.

13. The radiative cooling device according to claim 12, wherein the solar reflective layer is formed of at least one metal material selected from silver (Ag), aluminum (Al), gold (Au), copper (Cu), titanium (Ti), chromium (Cr), manganese (Mn), iron (Fe), and platinum (Pt) or an alloy material prepared by combining two or more metal materials selected therefrom.

14. The radiative cooling device according to claim 12, wherein the solar reflective layer is formed of at least one inorganic particle of $MgF_2$, $Al_2O_3$, $SiO_2$, MgO, ZnO, $CaCO_3$, AlN, $MgPHO_4$, and $TiO_2$ or a polymer comprising the inorganic particle, wherein the polymer comprises at least one polymer of polydimethyl siloxane (PDMS), polyurethane acrylate (PUA), polyvinylidene fluoride (PVDF), polyethylene terephthalate (PET), polyvinyl chloride (PVC), polyvinylidene fluoride (PVDF), dipentaerythritol hexaacrylate (DPHA), polymethyl methacrylate (PMMA), polybutyl methacrylate (PBMA), perfluoropolyether (PFPE), polycarbonate (PC), PTFE(Polytetrafluoroethylene), Spectralon, ETFE(Ethylene Tetra fluoro Ethylene), and polyethylene (PE), wherein the solar reflective layer reflects sunlight based on differences in refractive indexes of the inorganic particle.

15. A radiative cooling device having a multilayer structure, comprising:

a multilayer structure comprising at least one pair of at least one of an inorganic layer, a polymer layer, a composite inorganic layer, a composite polymer layer, and an inorganic material-polymer composite layer, and a radiative cooling layer for absorbing and emitting infrared light in a wavelength range corresponding to an atmospheric window while reflecting sunlight based on the multilayer structure, wherein the multilayer structure comprises at least one of a first structure in which the inorganic layer is laminated on the polymer layer, a second structure in which the inorganic layer is laminated on the polymer layer and the polymer layer is laminated thereon, a third structure in which the polymer layer is laminated on the inorganic layer, and a fourth structure in which the polymer layer is laminated on the inorganic layer and the inorganic layer is laminated thereon, and wherein the multilayer structure comprises at least one of a first repeat structure in which the first structure is repeatedly laminated at least once, a second repeat structure in which the second structure is repeatedly laminated at least once, a third repeat structure in which the third structure is repeatedly laminated at least once, and a fourth repeat structure in which the fourth structure is repeatedly laminated at least once.

16. A radiative cooling device having a multilayer structure, comprising:

a multilayer structure comprising at least one pair of at least one of an inorganic layer, a polymer layer, a composite inorganic layer, a composite polymer layer, and an inorganic material-polymer composite layer, and a radiative cooling layer for absorbing and emitting infrared light in a wavelength range corresponding to an atmospheric window while reflecting sunlight based on the multilayer structure, wherein the multilayer structure comprises at least one of a first structure in which the inorganic layer is laminated on the inorganic material-polymer composite layer and the inorganic material-polymer composite layer is laminated thereon, a second structure in which the inorganic layer is laminated on the inorganic material-polymer composite layer and an inorganic material-polymer composite layer comprising inorganic particles different from inorganic particles comprised in the inorganic material-polymer composite layer is laminated thereon, a third structure in which the inorganic layer is laminated on the inorganic material-polymer composite layer and an inorganic material-polymer composite layer based on a polymer different from a polymer forming the inorganic material-polymer composite layer is laminated thereon, a fourth structure in which the polymer layer is laminated on the composite inorganic layer and the inorganic material-polymer composite layer is laminated thereon, a fifth structure in which the composite inorganic layer is laminated on the polymer layer and the polymer layer is laminated thereon, and a sixth structure in which the inorganic layer is laminated on the composite polymer layer and the composite polymer layer is laminated thereon.

17. The radiative cooling device according to claim 16, wherein the multilayer structure comprises at least one of a first repeat structure in which the first structure is repeatedly laminated at least once, an second repeat structure in which the second structure is repeatedly laminated at least once, a third repeat structure in which the third structure is repeatedly laminated at least once, a fourth repeat structure in which the fourth structure is repeatedly laminated at least once, an fifth repeat structure in which the fifth structure is repeatedly laminated at least once, and a sixth repeat structure in which the sixth structure is repeatedly laminated at least once.

\* \* \* \* \*